(12) United States Patent
Malek et al.

(10) Patent No.: US 6,520,303 B1
(45) Date of Patent: Feb. 18, 2003

(54) POWER RAIL AND GUIDEBEAM ASSEMBLY FOR A VEHICLE TRANSPORTATION SYSTEM

(75) Inventors: Larry K. Malek, Monroeville; Thomas J. Burg, Forest Hills, both of PA (US)

(73) Assignee: Bombardier Transporation GmbH (DE)

( * ) Notice: Subject to any disclaimer, the term of this patent is extended or adjusted under 35 U.S.C. 154(b) by 0 days.

(21) Appl. No.: 09/936,372
(22) PCT Filed: Mar. 10, 2000
(86) PCT No.: PCT/US00/06370
§ 371 (c)(1),
(2), (4) Date: Jan. 7, 2002
(87) PCT Pub. No.: WO00/53449
PCT Pub. Date: Sep. 14, 2000

Related U.S. Application Data
(60) Provisional application No. 60/124,044, filed on Mar. 12, 1999.

(51) Int. Cl.[7] .................................................. B60M 1/00
(52) U.S. Cl. .................................... 191/22 R; 191/29 R
(58) Field of Search ............................ 191/22 R, 23 R, 191/29 R, 30, 32, 35, 39, 43; 104/89, 93

(56) References Cited

U.S. PATENT DOCUMENTS

| | | | | |
|---|---|---|---|---|
| 2,048,367 A | * | 7/1936 | Banks | 191/32 |
| 2,502,756 A | * | 4/1950 | Schmid | 174/150 |
| 2,904,621 A | * | 9/1959 | Grier | 174/126.1 |
| 3,208,245 A | * | 9/1965 | Rodeseike | 174/171 |
| 3,437,765 A | * | 4/1969 | Harmsen | 191/32 |
| 3,757,059 A | | 9/1973 | Falkiner-Nuttall | 191/29 |
| 3,790,725 A | | 2/1974 | Charamel et al. | 191/29 |
| 3,892,299 A | * | 7/1975 | Kilburg | 191/22 R |
| 4,090,452 A | | 5/1978 | Segar | 104/247 |
| 4,168,770 A | * | 9/1979 | Segar et al. | 191/32 |
| 4,668,031 A | | 5/1987 | Dumontet et al. | 339/9 E |
| 4,969,400 A | * | 11/1990 | Burg et al. | 104/247 |
| 4,970,962 A | | 11/1990 | Burg et al. | 104/130 |
| 5,126,514 A | | 6/1992 | Bommart | 191/22 DM |

* cited by examiner

Primary Examiner—S. Joseph Morano
Assistant Examiner—Robert J. McCarry, Jr.
(74) Attorney, Agent, or Firm—Webb Ziesenheim Logsdon Orkin & Hanson, P.C.

(57) ABSTRACT

A power rail and guidebeam assembly (10) for use in a vehicle transportation system conveys electric power to travelling vehicles in the vehicle transportation system. The power rail and guide beam assembly includes a guidebeam (12) having an H-shaped body (14). The body of the guidebeam (12) is defined by two flanges (16, 18) that are interconnected by a web (20). A mounting bracket (30) is secured to the web, with the mounting bracket (30) including a base and at least one ear (54). A power rail (26) is secured to the at least one ear (54) of the mounting bracket. The power rail is electrically insulated from the guidebeam (12) by the mounting bracket (30). The guidebeam (12) is preferably grounded to the earth.

25 Claims, 13 Drawing Sheets

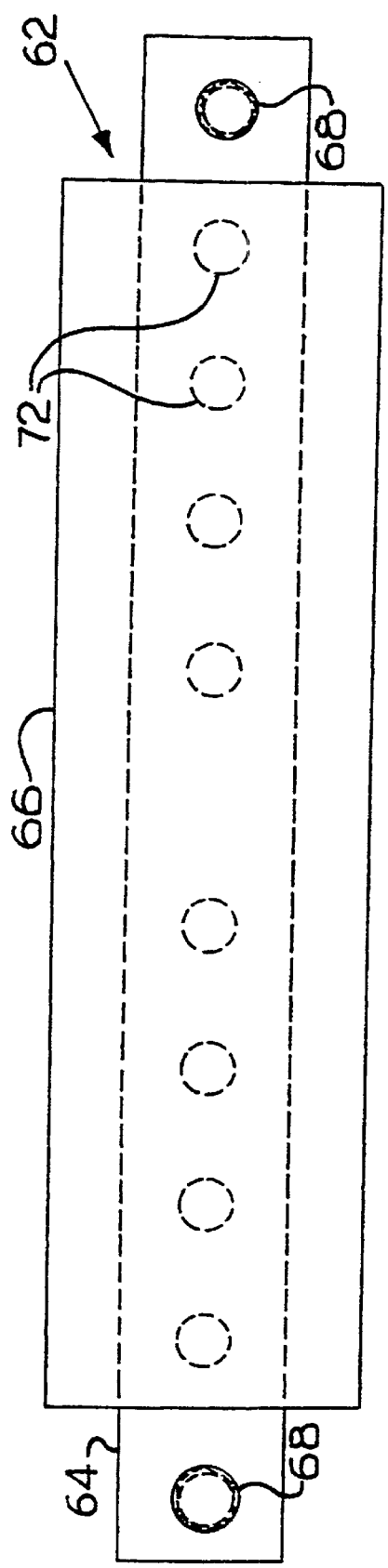
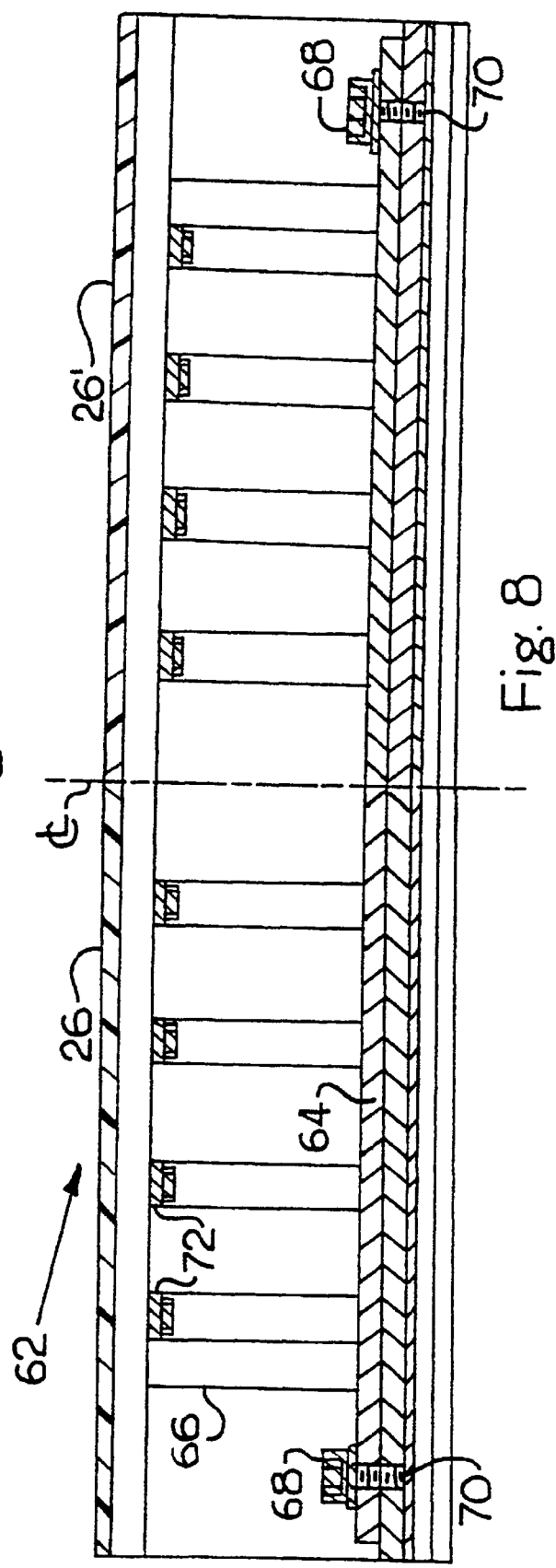
Fig. 6
Fig. 8

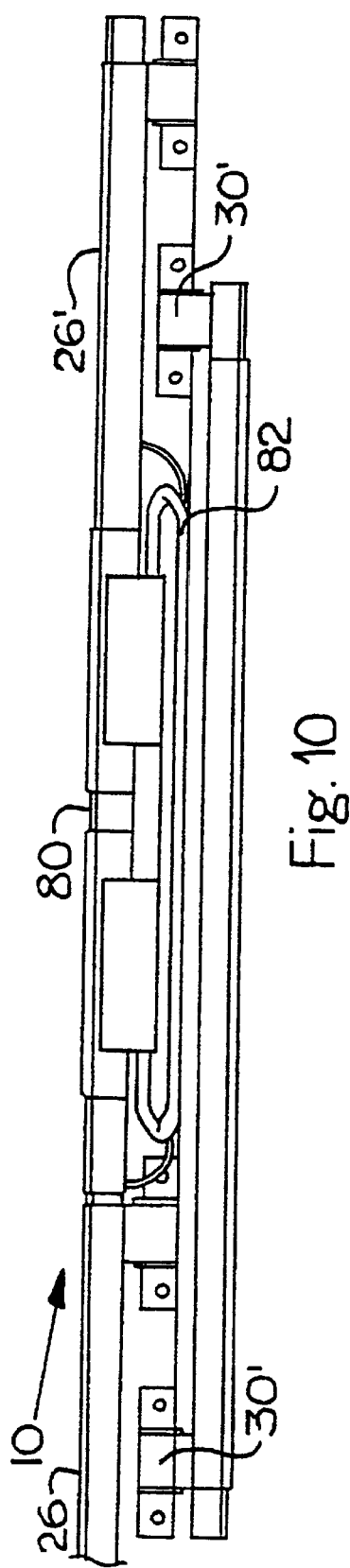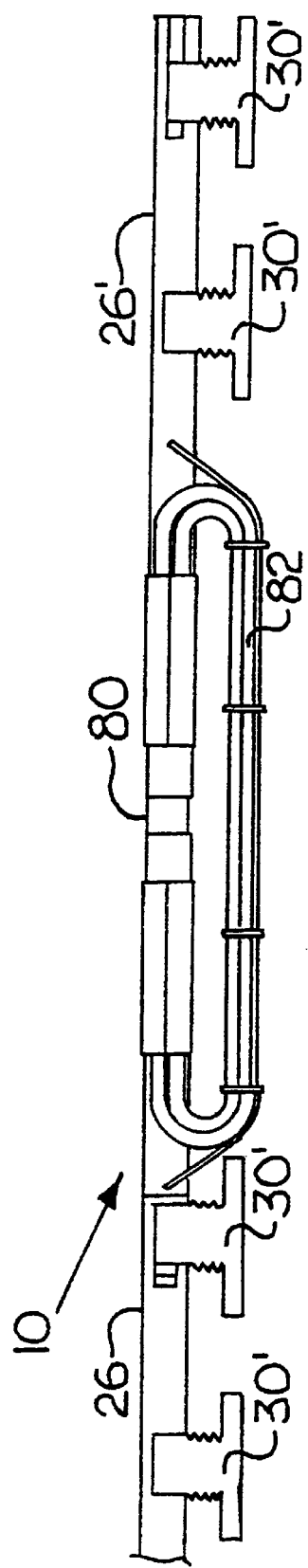

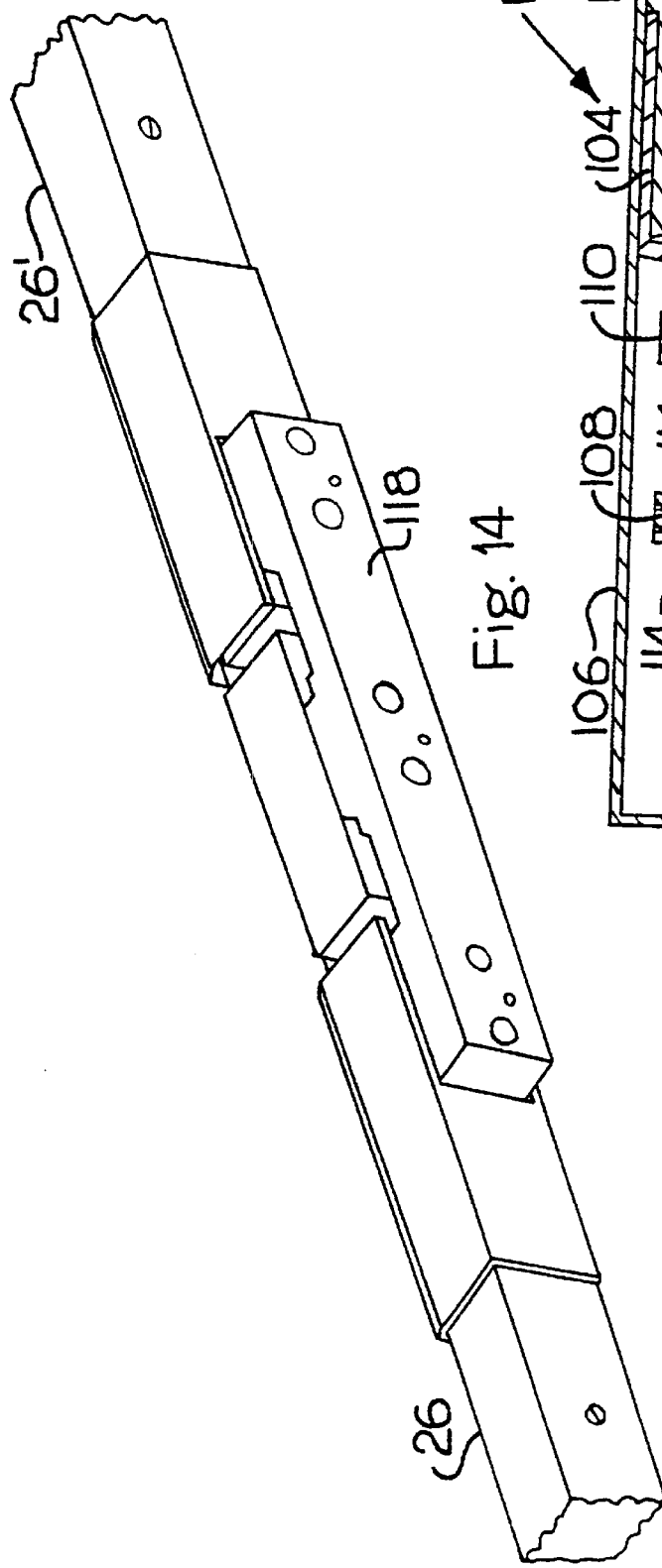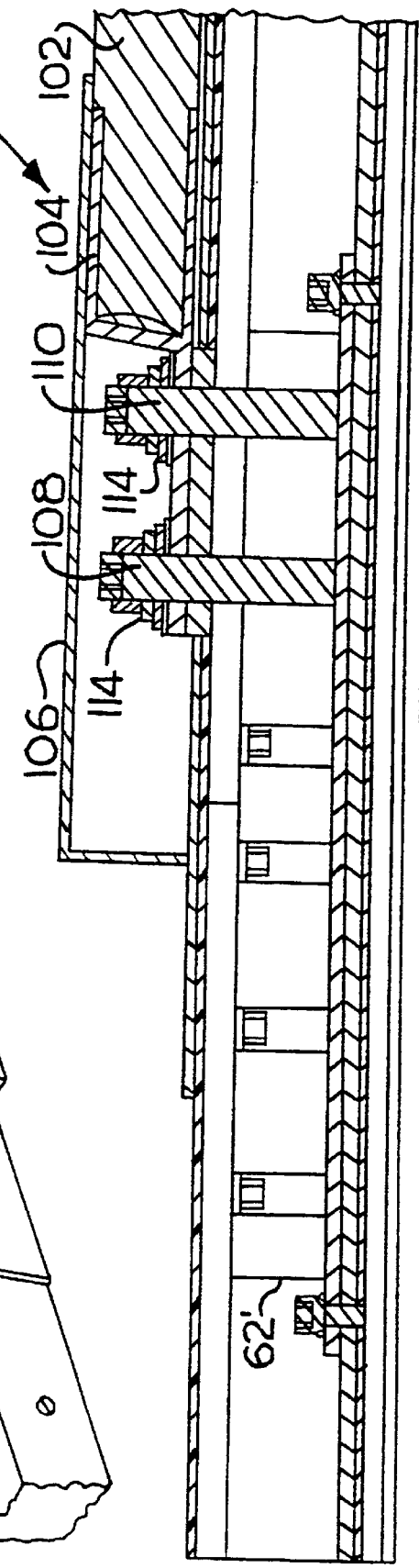

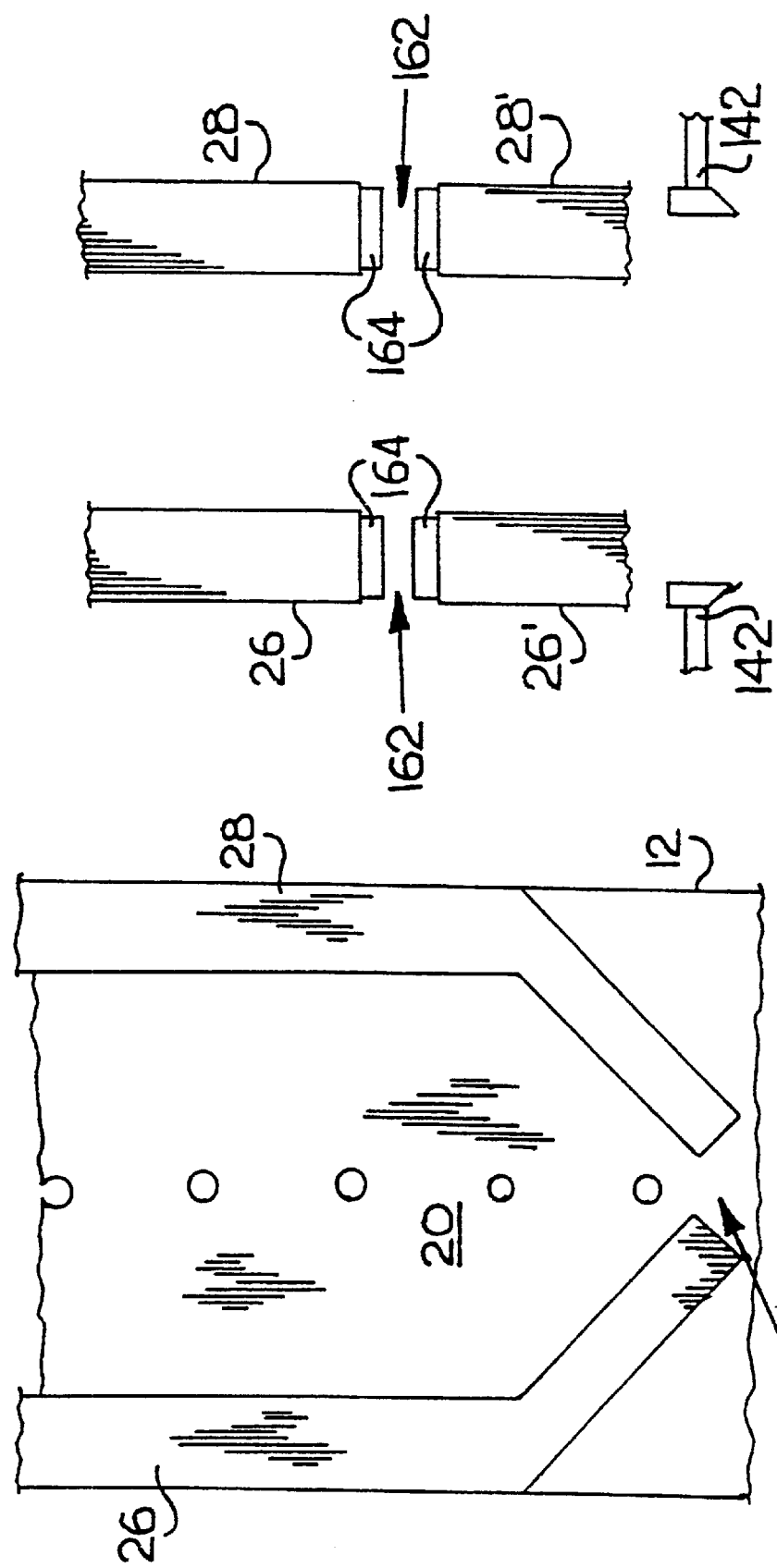

though this application claims benefit of provisional appln 60/124,044 filed Mar. 12, 1999.

POWER RAIL AND GUIDEBEAM ASSEMBLY FOR A VEHICLE TRANSPORTATION SYSTEM

This application claims benefit of provisional appln 60/124,044 filed Mar. 12, 1999.

BACKGROUND OF THE INVENTION

1. Field of the Invention

The present invention relates to a power rail and guidebeam assembly for a vehicle transportation system and, more particularly, to a power rail and guidebeam assembly for a "people mover" or other electrically powered vehicle.

2. Description of the Prior Art

Rail systems utilizing electrical energy conducted by the rails themselves are becoming increasingly popular for use in mass transit systems. Such rail systems are now frequently found in large metropolitan airports for moving people between terminals or from terminals to parking areas. These rail systems often employ electrically powered vehicles such as people movers. Rail guided vehicles, such as people movers, are typically "guided" or steered by a guidebeam which is also referred to as a guide rail. It is common for these vehicles to have a guide-frame that follows the guidebeam which steers the vehicle. The guide-frame includes a plurality of downward depending guide wheel assemblies that provide the physical interface between the guidebeam and the guide-frame of the vehicle. Electrical energy is transmitted from the guidebeam to the vehicle to power the vehicle. The guidebeam is secured to a roadway surface or "guideway". In general, the people mover or other electrically powered vehicle, the guidebeam and the guideway complete a vehicle transportation system.

In prior art vehicle transportation systems, the guidebeam is typically positioned within a depression or "guidebeam pit" formed between two laterally spaced concrete tracks. The concrete tracks are supported on the guideway surface. The people mover or other vehicle utilized in the system generally includes two pairs of resilient and laterally spaced main wheels that travel on the laterally spaced concrete tracks. In addition, the vehicle generally includes a guide-frame having several depending guide wheel assemblies that cooperate with the guidebeam to steer the vehicle. The guidebeam is usually an I-beam having a central vertical web. Guide wheels on the guide wheel assemblies are arranged horizontally with respect to the ground such that the guide wheels cooperate with the vertical web of the I-beam. The guidebeam may have power rails attached thereto that supply electrical power to the vehicle. The vehicle usually includes power rail collectors that interact with the power rails attached to the guidebeam to provide electrical power to the people mover or other similar electrically powered vehicle.

The prior art arrangement discussed hereinabove is well-known and conventional in the art. It suffers from the disadvantage that the concrete tracks and the intermediate guidebeam pit are expensive to construct. In addition, the electrical supply equipment for the vehicle, such as the power rails, is attached to the guidebeam. As stated previously, the guidebeam is located within the guidebeam pit formed between the concrete tracks. Dirt and debris unavoidably accumulate in and around the guidebeam, which tends to interfere with the electrical supply equipment that powers the vehicle. A typical prior art vehicle transportation system in which an electrically powered vehicle is powered and guided by a guidebeam located in a guidebeam pit is disclosed by U.S. Pat. No. 4,168,770 to Segar. A similar arrangement is disclosed by U.S. Pat. No. 4,090,452 also to Segar. Other pertinent patents in the field include: U.S. Pat. No. 3,892,299 to Kilburg; U.S. Pat. No. 4,969,400 to Burg et al; U.S. Pat. No. 4,970,962 to Burg et al.; and U.S. Pat. No. 5,126,514 to Bommart.

In view of the foregoing, it is an object of the present invention to provide a power rail and guidebeam assembly that may be incorporated into a vehicle transportation system which results in reduced construction costs. It is a further object of the present invention to provide a power rail and guidebeam assembly for a vehicle transportation system that is less susceptible to interference caused by the accumulation of dirt or moisture on the guidebeam.

SUMMARY OF THE INVENTION

The present invention is a power rail and guidebeam assembly for conveying electric power to vehicles guided by the guidebeam. The assembly includes a guidebeam having an H-shaped body. The body of the guidebeam is defined by two flanges that are interconnected by a web. A mounting bracket is secured to the web. The mounting bracket has a base and at least one ear. A power rail is connected to the at least one ear of the mounting bracket. The power rail is electrically insulated from the guide beam by the mounting bracket. The guide beam is preferably configured to be grounded to earth.

The mounting bracket may have a Y-shaped body and include two spaced apart ears. The ears of the mounting bracket may each have a power rail connected thereto. The assembly may include a plurality of mounting brackets. At least one of the mounting brackets may be fixed to the power rail by a pin passing through the power rail and the at least one ear of the mounting bracket. The body of the power rail is preferably made of aluminum. The body of the power rail may be C-shaped and define a recess configured to receive the at least one ear of the mounting bracket. The body of the power rail may define a collector opening configured to receive a power contact from an electrically powered vehicle. A collective shoe contact surface may be positioned in the collector opening and be attached to the body of the power rail. The collector shoe contact surface is preferably configured to engage the power contact from the electrically powered vehicle.

The power rail may include an electrically insulating cover made of PVC. A web of the guidebeam preferably defines a plurality of holes and the base of the mounting bracket preferably defines at least one hole. A fastener may pass through the at least one hole in the base of the mounting bracket and one of the holes defined in the web such that the mounting bracket is secured to the web of a guidebeam.

The assembly may further include a plurality of power rails positioned in end-to-end relationship with adjacent power rails connected by a rail joint. The rail joint preferably extends between the adjacent power rails and is positioned within the recess defined by the body of the respective adjacent power rails. The rail joint may include a strip portion and a body portion connected to the strip portion. The body portion is preferably expandable by expansion members positioned within the body portion. Preferably, at least two adjacent power rails are connected by an expansion joint that permits longitudinal expansion between the two adjacent power rails. The expansion joint preferably includes an arrangement for providing electrical continuity between the two adjacent power rails. A power connector assembly may be connected to the body portion of the rail joint assembly by a pair of elongated coupling members. The power connector assembly is configured to provide direct current power to the power rails.

The present invention is also a vehicle transportation system. The vehicle transportation system includes a vehicle having a vehicle body and a plurality of driving wheels connected to the vehicle body. A guide-frame is attached to the vehicle body and has a plurality of depending guide wheels and a power contact. The power rail and guidebeam assembly, as discussed hereinabove, preferably coacts with the guide wheels. The vehicle may be positioned along a vertical axis passing through the web. The web may extend along an axis transverse to the vertical axis. In particular, the web may extend along a horizontal axis. The vehicle transportation system may further include a guideway along which the vehicle travels. The guidebeam is preferably secured to the guideway and the driving wheels of the vehicle preferably contact the guideway surface.

Further details and advantages of the present invention will become apparent in the following detailed description, in conjunction with the drawings, wherein like parts are designated with identical reference numerals and similar parts are designated with primed reference numerals.

BRIEF DESCRIPTION OF DRAWINGS

FIG. 6 is a top plan view of a rail joint assembly used to join adjacent power rails in the power rail and guidebeam assemblies of FIGS. 1 and 4;

FIG. 8 is a cross-sectional view taken along lines VIII—VIII in FIG. 7;

FIG. 9 is a side elevational view of the power rail and guidebeam assembly of FIG. 4 at an expansion joint located between two adjacent power rails;

FIG. 10 is a top plan view of the power rail and guidebeam assembly of FIG. 9;

FIG. 13 is a cross-sectional view of a modified rail joint assembly similar to the rail joint assembly of FIG. 8 and including a power connector assembly attached to the power rail;

FIG. 14 is a top perspective view of a mechanical isolation joint made in accordance with the present invention and shown positioned between two adjacent power rails;

FIG. 19 is a schematic top plan view of an entry ramp end of the power rails of the power rail and guidebeam assembly used in the vehicle transportation system of FIG. 15; and FIG. 20 is a schematic top plan view of two adjacent power rails having rail end on/off ramps at a switch gap between the adjacent power rails.

DETAILED DESCRIPTION OF THE PREFERRED EMBODIMENTS

Figure 1:
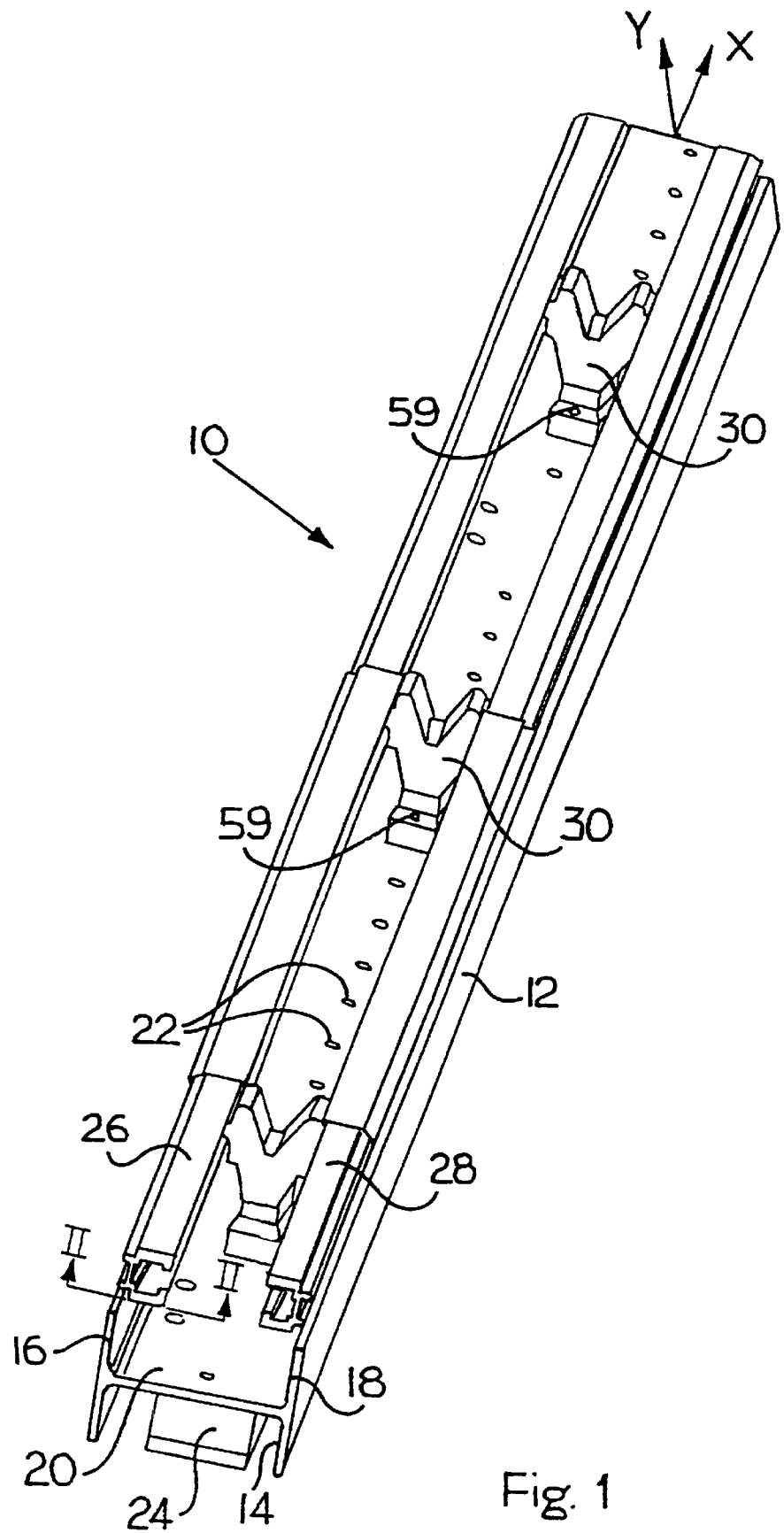
FIG. 1 is a top perspective view of a power rail and guidebeam assembly according to a first embodiment of the present invention.

FIG. 1 shows a power rail and guidebeam assembly 10 made in accordance with the present invention. The assembly 10 is intended to be incorporated as part of a vehicle transportation system as will be discussed hereinafter. The assembly 10 includes a guidebeam 12. In particular, the guidebeam 12 has an H-shaped body 14 defined by two flanges 16, 18 that are interconnected by a web 20. The web 20 extends along an axis substantially transverse to a vertical axis Y passing through the web 20. The vertical axis Y is perpendicular to a longitudinal axis X, i.e., a horizontal axis, of the guidebeam 12 in FIG. 1. At least one of the flanges 16, 18 is configured to be electrically grounded to earth. A plurality of holes 22 is defined in the web 20. The holes 22 are preferably defined along the longitudinal axis of the guidebeam 12 and are spaced apart at about six inch intervals. The holes 22 provide exit points for water to drain from the top surface of the web 20. The guidebeam 12 is made of metal and preferably stainless steel. At least one mounting support 24 is secured to a lower surface of the guidebeam 12 and is configured to support the guidebeam 12 on a vehicle guideway (not shown).

Figure 2:
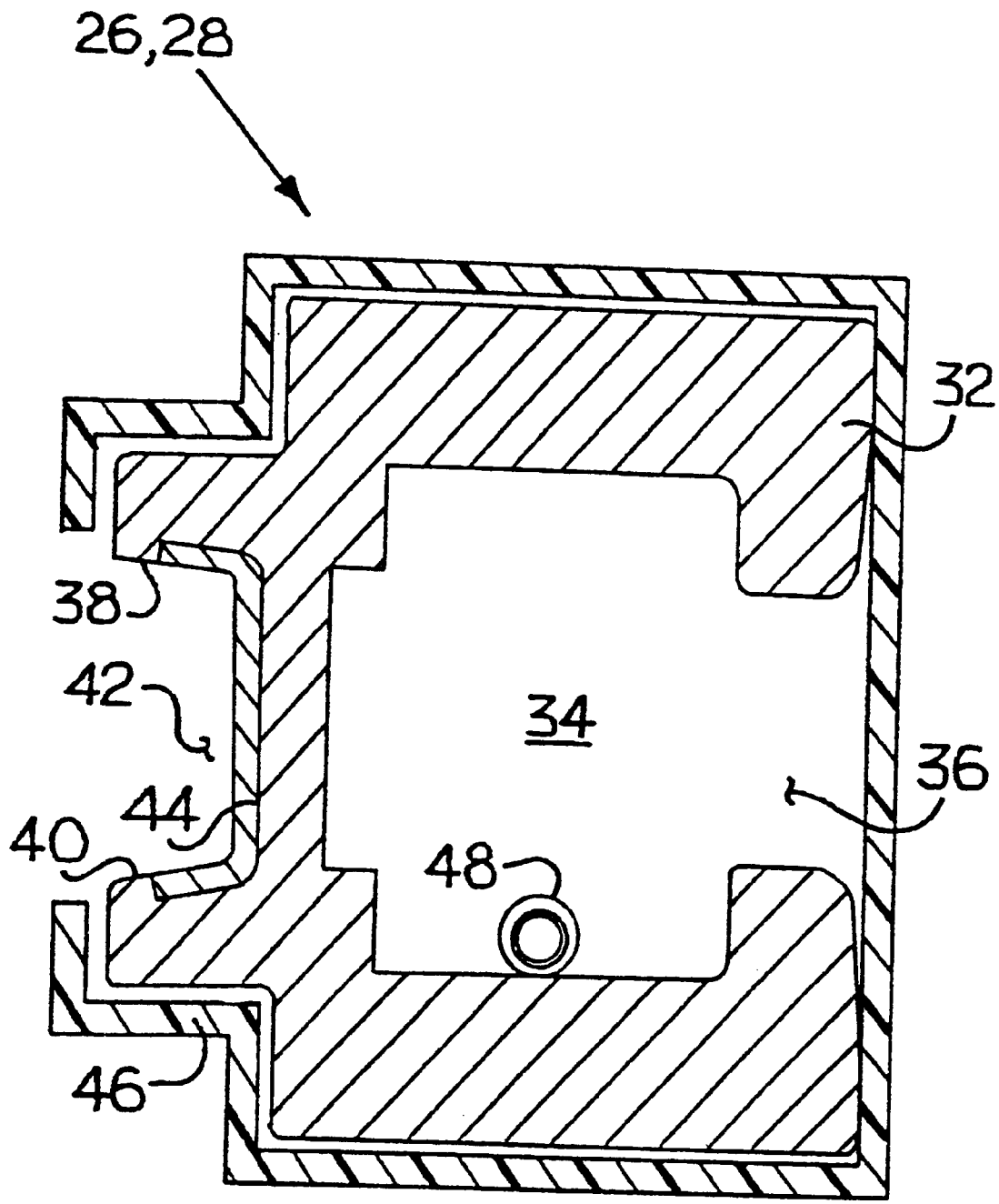
FIG. 2 is a cross-sectional view taken along lines II—II in FIG. 1.
Figure 3:
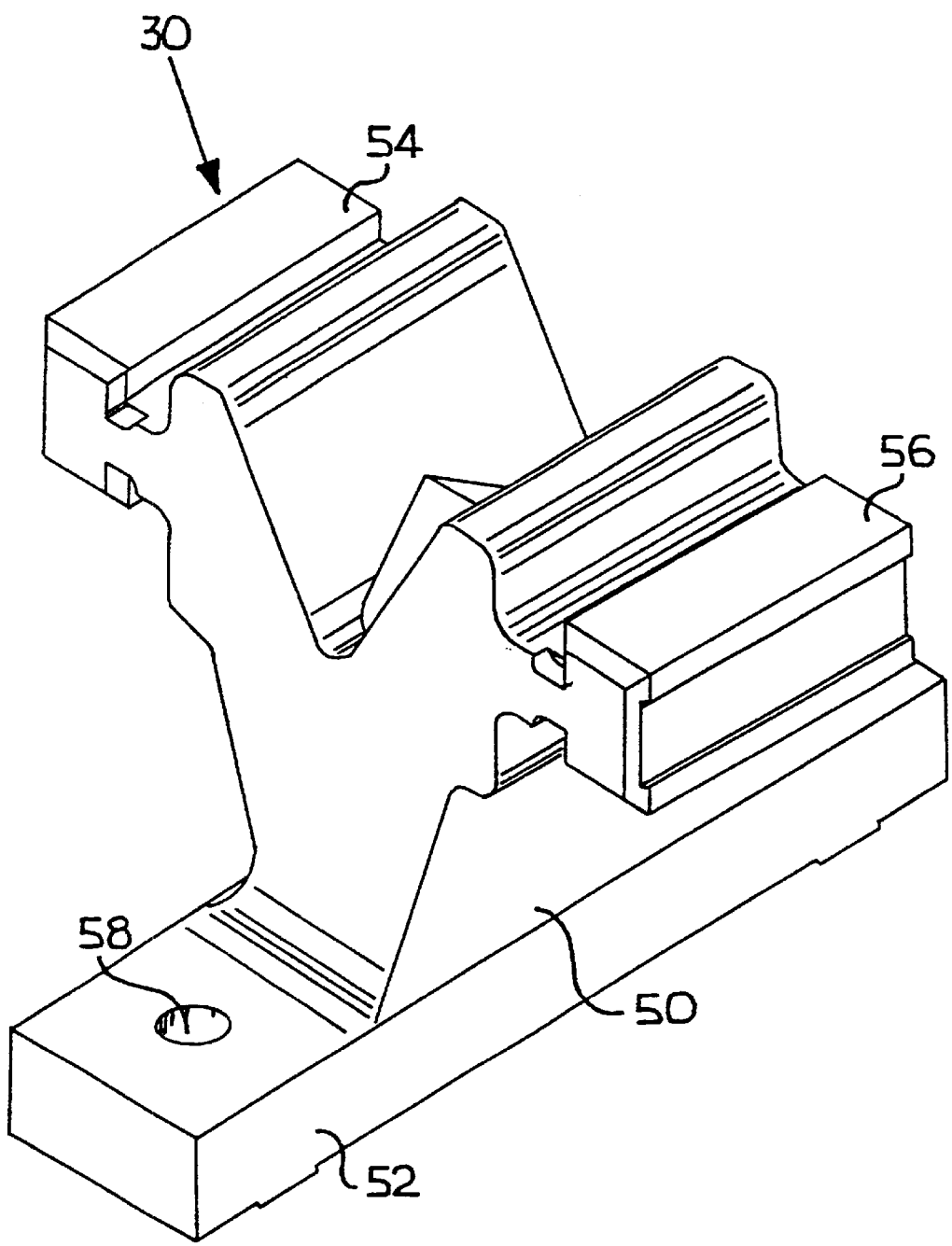
FIG. 3 is a top perspective view of a mounting bracket according to a first embodiment of the present invention and used in the power rail and guidebeam assembly shown in FIG. 1.

Referring now to FIGS. 1–3, the power rail and guidebeam assembly 10 further includes two substantially parallel power rails 26, 28 that are secured to the guidebeam 12 by at least one, but preferably a plurality of mounting brackets 30. FIG. 2 shows a vertical cross section of one of the power rails 26, 28. FIG. 3 is a top perspective view of one of the mounting brackets 30. The power rails 26, 28 each have a generally C-shaped body 32 that defines a recess 34 having an opening 36. The C-shaped body 32 further includes a pair of legs 38, 40 that define a collector opening 42 therebetween. A collector shoe contact surface 44 is positioned within the collector opening 42 and is connected to the C-shaped body 32. A protective and electrically insulating rail cover 46 substantially encloses the C-shaped body 32 except in the vicinity of the collector opening 42 that houses the collector shoe contact surface 44. To prevent frost or ice from forming on the power rails 26, 28, a heating cable 48 may be positioned in the recess 34 defined by the. C-shaped body 32 and extend in the longitudinal direction of the respective power rails 26, 28. The C-shaped body 32 of the power rails 26, 28 is preferably made of aluminum, channel-type extrusions, or made of another metal having suitable electrical conductivity. The power rails 26, 28 are typically supplied in thirty foot lengths. The rail cover 46 is preferably made of PVC and is provided in five foot lengths. The collector shoe contact surface 44 is preferably made of stainless steel and, in particular, made of 304 grade stainless steel. The power rails 26, 28 preferably have a nominal continuous current rating of twelve hundred amperes at 40° C. ambient temperature. The power rail and guidebeam assembly 10 of the present invention is intended to utilize DC power. Therefore, one of the power rails 26, 28, for example power rail 26, is the positive power rail and the other power rail, power rail 28, is the negative power rail.

The power rails 26, 28 are secured to the guide beam 12 by the plurality of mounting brackets 30. FIGS. 1 and 3 show a first embodiment of the mounting brackets 30. The mounting brackets 30 each have a body 50 made of electrical grade, glass fiber reinforced polyester. The body 50 of each of the mounting brackets 30 is defined by a base 52 and two spaced apart ears 54, 56. The ears 54, 56 may be separate units that are secured to the base 52 or formed integrally therewith. As shown in FIG. 3, the body 50 of the mounting bracket 30 is substantially Y-shaped. Holes 58 are symmetrically defined in the base 52 at each longitudinal end for securing the mounting bracket 30 to the guidebeam 12. However, only one hole 58 is shown in the perspective view of the mounting bracket 30 in FIG. 3. Fasteners 59 (shown in FIG. 1), such as nuts, bolts and associated hardware, secure the respective mounting brackets 30 to the web 20 of the guidebeam 12. The fasteners 59 cooperate with the holes 58 defined in the base 52 of the respective mounting brackets 30 and the spaced apart holes 22 in the web 20 of the guidebeam 12. The mounting brackets 30 are preferably positioned at approximately five foot intervals along the guidebeam 12. The spaced apart holes 22 in the web 20 of the guide beam 12 provide flexibility in locating the mounting brackets 30 along the guidebeam 12.

The power rails 26, 28 are slidably received over the ears 54, 56 of the respective mounting brackets 30. The ears 54, 56 are received within the internal recess 34 defined by the body 32 of the respective power rails 26, 28. The power rails 26, 28 preferably cooperate with the ears 54, 56 of the mounting brackets 30 without fasteners or other securing hardware. The slidable connection between the ears 54, 56 and the power rails 26, 28 securely holds and positions the power rails 26, 28 without hindering longitudinal expansion and contraction of the power rails 26, 28 caused by temperature changes. As will be appreciated by those skilled in the art, the insulating rail covers 46, covering the body 32 of the respective power rails 26, 28, are installed after the power rails 26, 28 are joined with the mounting brackets 30. Once installed, the rail covers 46 are held captive between adjacent mounting brackets 30. The electrically insulating mounting brackets 30 are preferably designed to withstand 72,000 amperes peak short circuit. The mounting brackets 30 electrically insulate the power rails 26, 28 from the guide beam 12.

Figure 4:
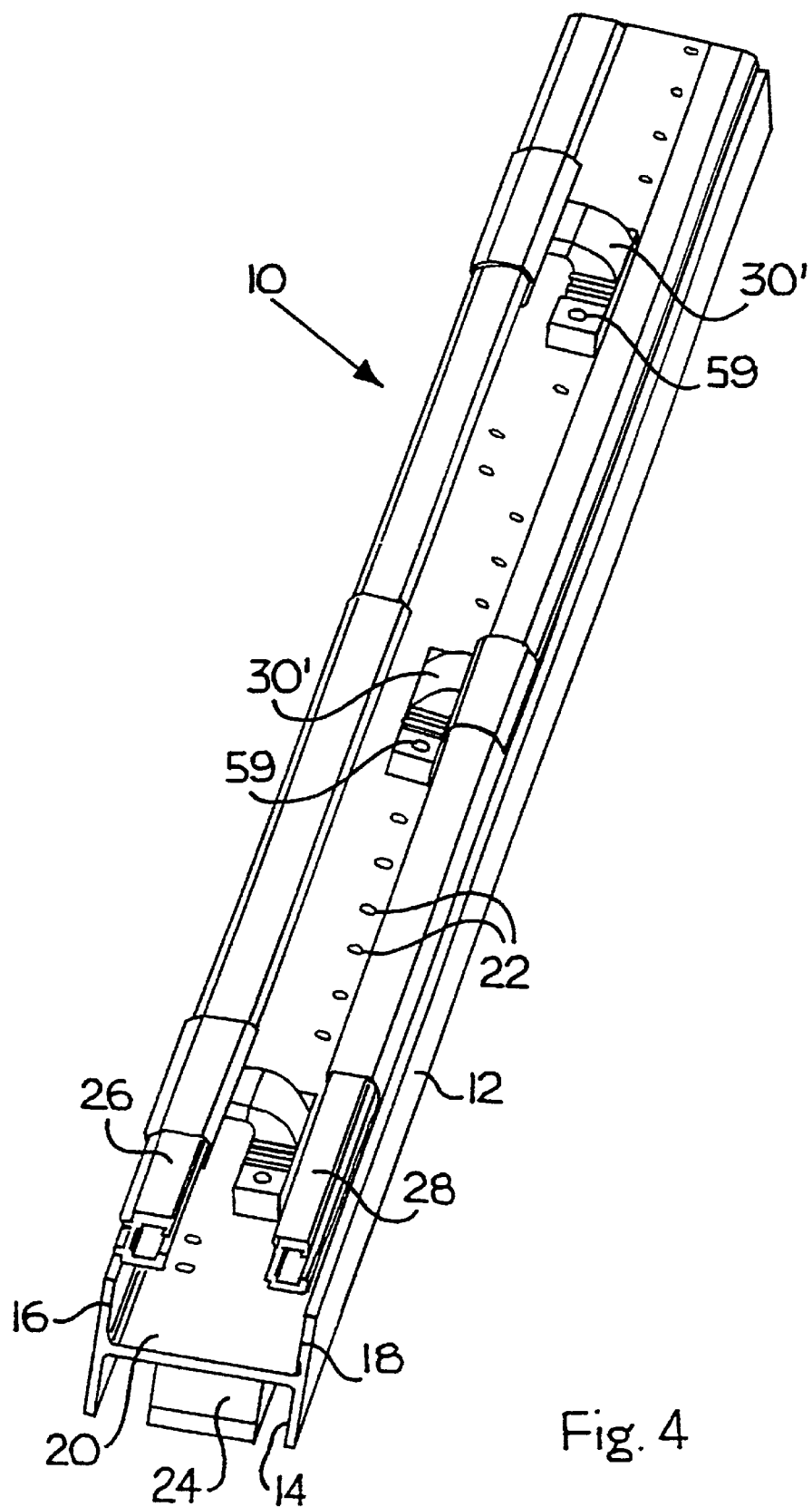
FIG. 4 is a top perspective view of the power rail and guide beam assembly according to a second embodiment of the present invention.
Figure 5:
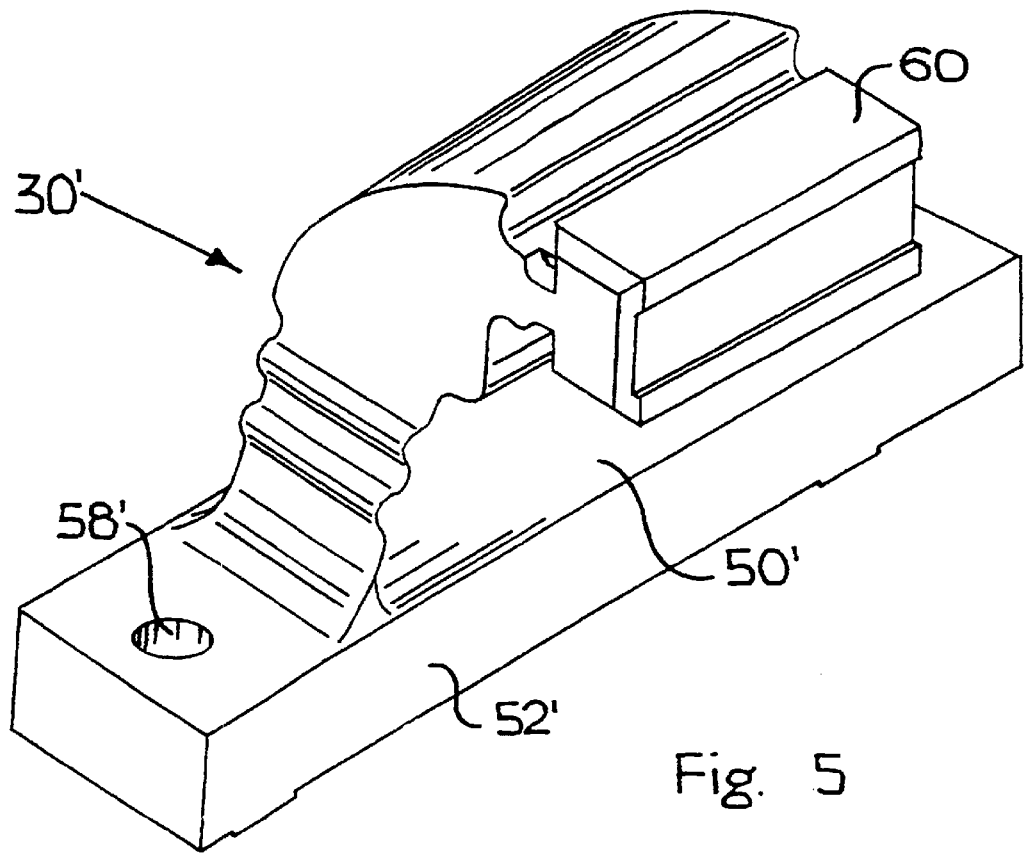
FIG. 5 is a top perspective view of an second embodiment of the mounting bracket according to the present invention used in the power rail and guidebeam assembly shown in FIG. 4.

Referring to FIGS. 4 and 5, an alternative embodiment of the mounting bracket 30 is shown and designated with the reference numeral 30'. FIG. 4 shows a plurality of the mounting brackets 30' incorporated in the power rail and guidebeam assembly 10. FIG. 5 is a top perspective view of one of the mounting brackets 30'. The mounting brackets 30' each have a body 50' that includes a base 52' defining two longitudinal spaced holes 58'. The body 50' of each of the mounting brackets 30' that includes a single ear 60, instead of the dual-ear configuration of the mounting brackets 30 discussed hereinabove. Consequently, two of the mounting brackets 30' are required to support the power rails 26, 28, in the assembly 10 of FIG. 4 in contrast to the dual-ear mounting brackets 30 discussed hereinabove. The mounting brackets 30' shown in FIGS. 4 and 5 are identical in all other respects to the mounting brackets 30 discussed previously.

Figure 7:
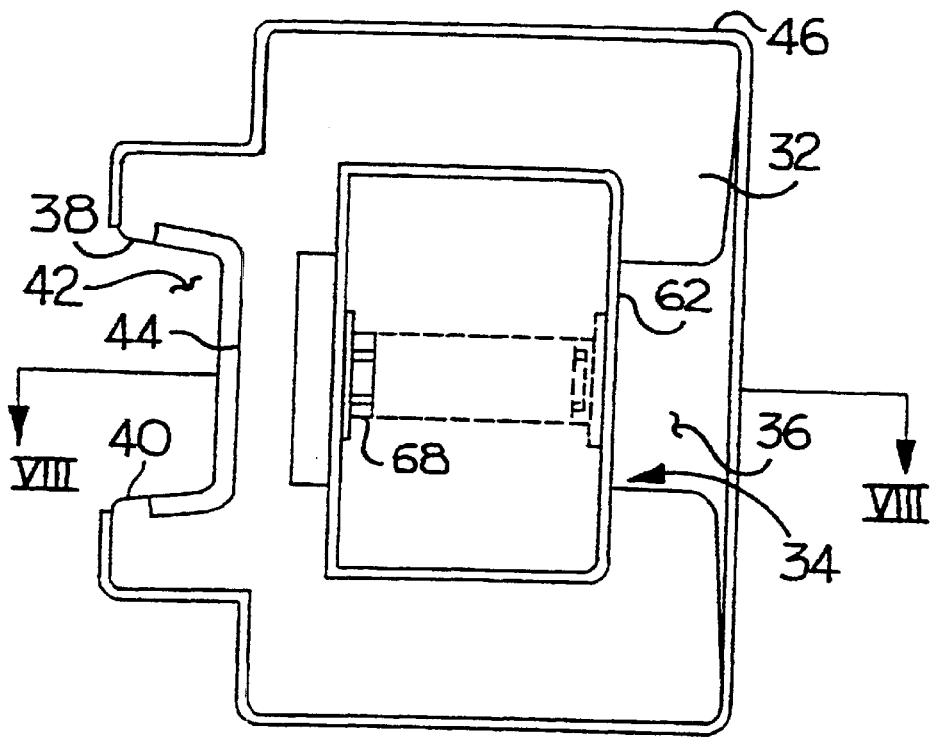
FIG. 7 is an end elevational view of a power rail having the rail joint assembly of FIG. 6 positioned within the power rail.

FIGS. 6–8 show a rail joint 62 used to join the power rails 26, 28 with adjacent power rails 26', 28'. FIG. 8 shows two adjacent power rails 26, 26' that are connected by the rail joint 62. The rail joint 62 extends between the adjacent power rails 26, 26' and is positioned within the recess 34 defined by the body 32 of the respective adjacent power rails 26, 26'. The rail joint 62 generally includes a rectangular strip or base portion 64 and a body portion 66 connected to the strip portion 64. The strip portion 64 is preferably made of stainless steel and is secured to the adjacent power rails 26, 26' by a pair of end fasteners 68. The end fasteners 68 preferably cooperate with blind holes 70 defined in the body 32 of the adjacent power rails 26, 26'. The blind holes 70 are located within the recess 34 formed by the body 32 of the respective adjacent power rails 26, 26'. The body portion 66 is connected to strip portion 64 and preferably made of copper or another ductile metal that is easily bendable. A plurality of expansion members 72, i.e., set screws, are located within the body portion 66. The expansion members 72 are configured to expand the body portion 66 outward such that an outer surface of the body portion 66 presses against an inner surface of the body 32 of the adjacent power rails 26, 26'. Consequently, the body portion 66 generally provides a substantial frictional connection between the adjacent power rails 26, 26' and maintains their mutual connection because of this frictional connection. The rail joint 62 provides both mechanical and electrical continuity between the adjacent power rails 26, 26', as will be appreciated by those skilled in the art.

Referring to FIGS. 9 and 10, expansion joints 80 are preferably located at intervals along the assembly 10. A single expansion joint 80 is shown in FIGS. 9 and 10 and is located between adjacent power rails 26, 26'. The expansion joint 80 permits longitudinal expansion between the adjacent power rails 26, 26' without buckling or deformation. The expansion joints 80 are spaced normally at about three hundred fifty foot intervals along the assembly 10 and have a sliding, interleaved configuration that presents no mechanical interruption of the collection shoe contact surfaces 44 (not shown) between the adjacent power rails 26, 26'. A jumper cable 82 connects the adjacent power rails 26, 26' and provides for the electrical continuity therebetween. Fasteners (not shown) secure the ends of the jumper cable 82 to the respective power rails 26, 26'.

Figure 11:
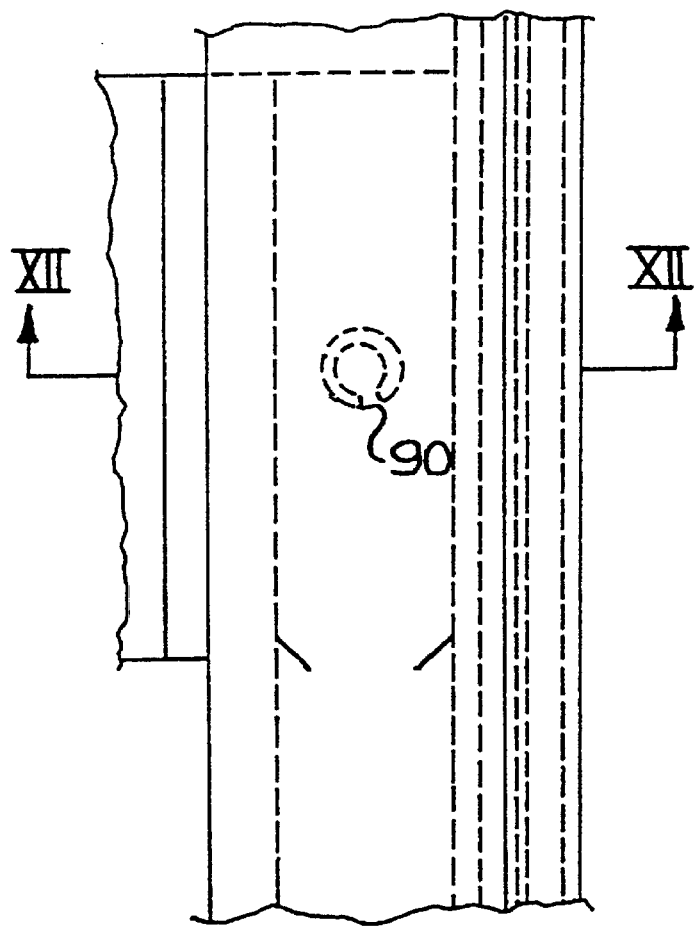
FIG. 11 is a top plan view of a portion of the power rail and guidebeam assembly according to the present invention showing a spring pin used to anchor a power rail to a mounting bracket in each of the first and second embodiments of the power rail and guidebeam assembly.
Figure 12:
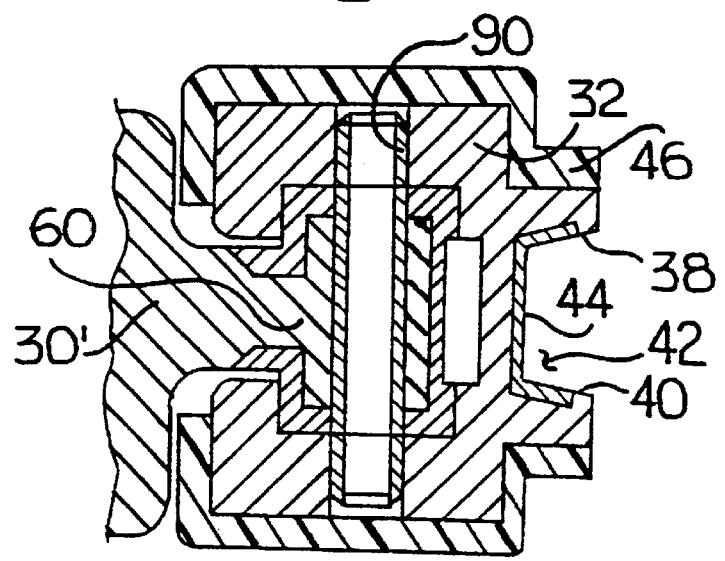
FIG. 12 is a cross-sectional view taken along lines XII—XII in FIG. 11.

Referring now to FIGS. 11 and 12, approximately midway between the spaced locations of the expansion joints 80 along the assembly 10, (i.e., approximately every three hundred fifty feet), a spring pin 90 is used to anchor the power rails 26, 28 at that location to the nearest mounting bracket 30'. The spring pin 90 preferably extends through the body 32 of the power rails 26, 28 and the ear 60 of the mounting bracket 30'. Only a portion of the ear 60 of the mounting bracket 30' is shown in FIG. 12 for simplicity. The spring pin 90 is also used in a similar manner with the mounting brackets 30 discussed previously in connection with FIGS. 1–3. The spring pin 90 is preferably made of stainless steel. The spring pin 90 also provides stability at power feed points to the power rails 26, 28 by minimizing the thermal movement of the large power cables which are attached to the power rails 26, 28.

Referring now to FIG. 13, external power is supplied to the power rails 26, 28 through a power connector assembly 100. The power connector assembly 100 provides the means by which power feed cables 102 are connected to the power rails 26, 28. Only one power feed cable 102 is shown in FIG. 13. The power connector assembly 100 includes a compression terminal 104 that is enclosed by a protective insulation cover 106. Power feed cable 102 is coupled to a modified rail joint 62' by two elongated coupling members 108, 110. The modified rail joint 62' is substantially similar to the rail joint 62 discussed hereinabove in connection with FIGS. 6–8, but has been modified to coact with the elongated coupling members 108, 110 to attach the compression terminal 104 to the power rails 26, 28. Preferably, the power feed cable 102 is stripped of an appropriate amount of cable insulation and the exposed metal lead is held captive in a compression terminal 104. The coupling members 108, 110 preferably include fasteners 114 that connect the compression terminal 104 to power rail 26 and modified rail joint 62' which are shown in FIG. 13.

The power rail and guidebeam assembly 10 of the present invention is preferably segmented through the use of mechanical isolation joints 118. A single mechanical isolation joint 118 is shown in FIG. 14. The mechanical isolation joint 118 shown in FIG. 14 allows for isolation of adjacent powered sections of the assembly 10 for fault isolation, maintenance and other purposes. The isolation joint 118 provides for the physical separation of adjacent powered sections of the assembly 10 and is made of an electrically insulating material such as glass melamine. Segmentation prevents bridging by a vehicle, such as a train or people mover, between adjacent powered sections of the assembly 10, when a segment of the assembly 10 is deactivated. In particular, this feature is achieved by the placement of a plurality of the mechanical isolation joints 118 at intervals along the assembly 10. The mechanical isolation joints 118 "segment" the assembly 10 and are preferably placed at intervals meeting system requirements that are greater than the electrical length of the ultimate system's maximum vehicle length. The mechanical isolation joint 118 when used between adjacent power rails 26, 26' must be spaced apart at least a greater distance than the distance between a vehicle's (not shown) front and rear power collectors. In general, vehicles interfacing with the assembly 10 will include power collector assemblies mounted at the front and rear of the vehicle. These power collector assemblies provide contact with the power rails 26, 28 and transfer power to the vehicle, as is well-known in the art.

Referring to FIGS. 15–20, the present invention is also a vehicle transportation system 120 that includes a vehicle guideway 122 a vehicle 124 configured to travel along the guideway 122, and the power rail and guidebeam assembly 10 discussed hereinabove. The guidebeam 12 of the power rail and guidebeam assembly 10 is secured to the guideway 122 by a plurality of the mounting supports 24, discussed previously in connection with FIG. 1. The mounting supports 24 are typically provided in ten to twenty foot sections. The vehicle 124 is configured to coact with the power rail and guidebeam assembly 10 through the guidebeam 12 and the power rails 26, 28.

Figure 15:
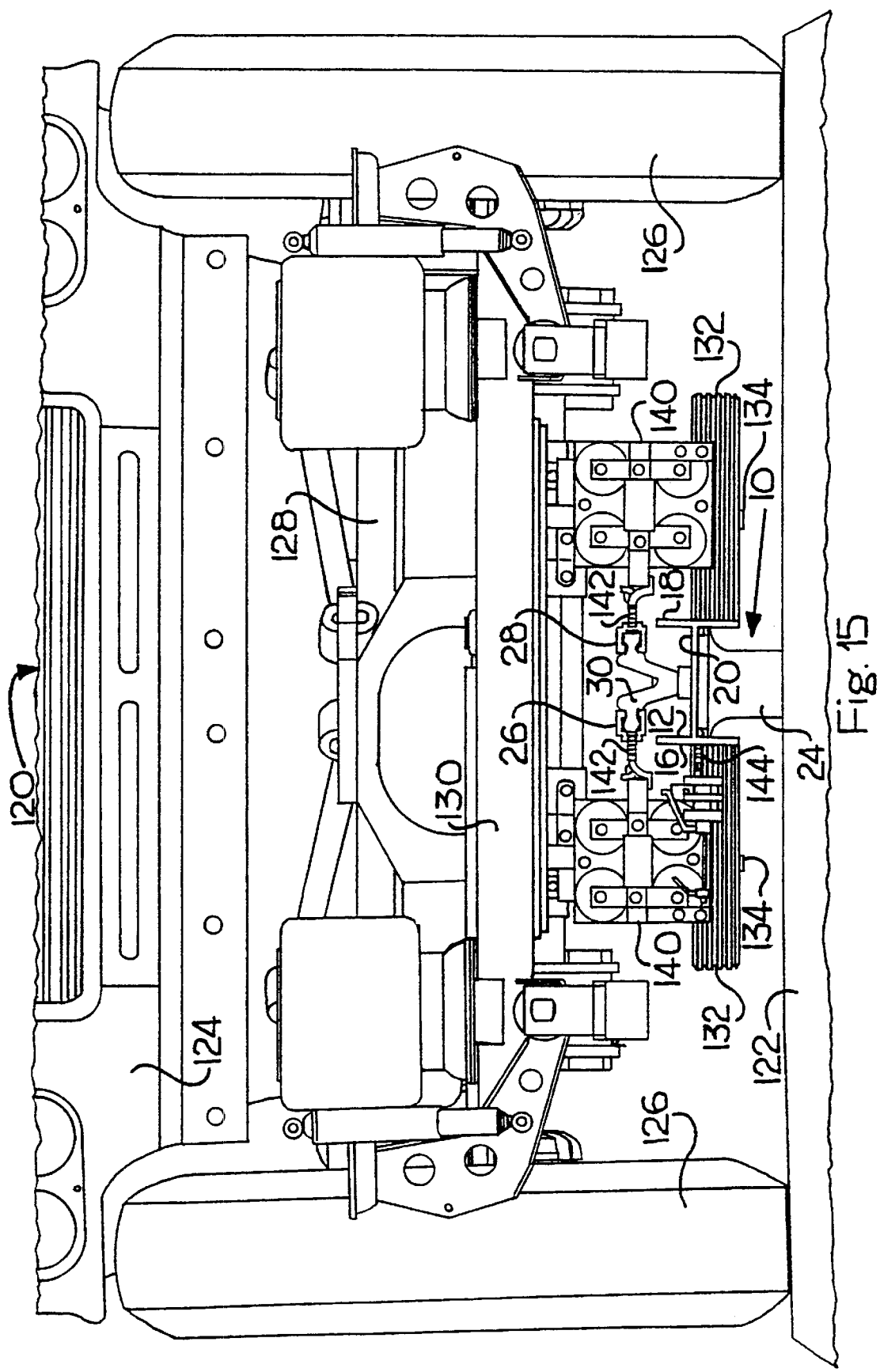
FIG. 15 is a front elevational view of a vehicle transportation system made in accordance with the present invention and including the power rail and guidebeam assembly of the present invention.

The vehicle 124 generally includes four drive wheels 126, only two of which are shown in the front elevational view of FIG. 15. The drive wheels 126 are interconnected by a chassis 128 of the vehicle 124. The vehicle 124 further includes a guide-frame 130 having a depending plurality of guide wheels 132. The guide wheels 132 are rotatably connected to the guide-frame 130 by guide shafts 134. The guide-frame 130 is connected to the chassis 128 by any means customary in the art. Collector assemblies 140 are mounted on the guide-frame 130 to provide power contact points with the power rails 26, 28 and a ground contact point with the guidebeam 12. In particular, the collector assemblies 140 include brushes or power contacts 142 that are configured to contact the power rail collector shoe contact surfaces 44 (not shown) of the power rails 26, 28 and provide electrical power to the vehicle 124. The power rails 26, 28 typically provide a 750-Vdc power feed to the vehicle 124. The collector assemblies 140 further include a ground contact 144. The ground contact 144 engages one of the flanges 16, 18 of the guidebeam 12. Each of the contacts, the power contacts 142 and the ground contact 144, is preferably spring biased metallic and conductive contacts, which are preferably made of a copper graphite material that is non-abrasive to the 304 stainless steel of the collector shoe contact surfaces 44 of the power rails 26, 28 and, further, non-abrasive to the preferable stainless steel flanges 16, 18 of the guidebeam 12.

Once the vehicle 124 is provided power through the collector assemblies 140 and is propelled along the guideway 122, the guide wheels 132 contact the outer surface of the flanges 16, 18 of the guidebeam 12. The guidebeam 12 provides steering guidance to the vehicle 124. Power is provided to the vehicle 124 via the power rails 26, 28 which interface with the respective power contacts 142. One of the flanges 16, 18 of the guidebeam 12 is grounded to earth to complete the power circuit providing power to the vehicle 124. In FIG. 15, flange 16 of the guidebeam 12 is grounded to the earth.

As discussed previously, one of the power rails 26, 28 is a positive power rail and the other power rail is a negative power rail to supply DC power to the vehicle 124. The path of the positive and negative power feed cables 102 (not shown) that connect to the compression terminal 104 (not shown), which were discussed previously in connection with FIG. 13, is preferably through a slot (not shown) in the web 20 in the guidebeam 12. The path of a ground connection cable (not shown) is preferably through a slot in the web 20 in the guidebeam 12. The slots in the guidebeam 12 and the web 20 enable the power feed cables and the ground connection cable to be routed gradually to the power rails 26, 28 within the vertical clearance available between the web 20 of the guidebeam 12 and the surface of the guideway 112, as will be appreciated by those skilled in the art.

Figure 17:
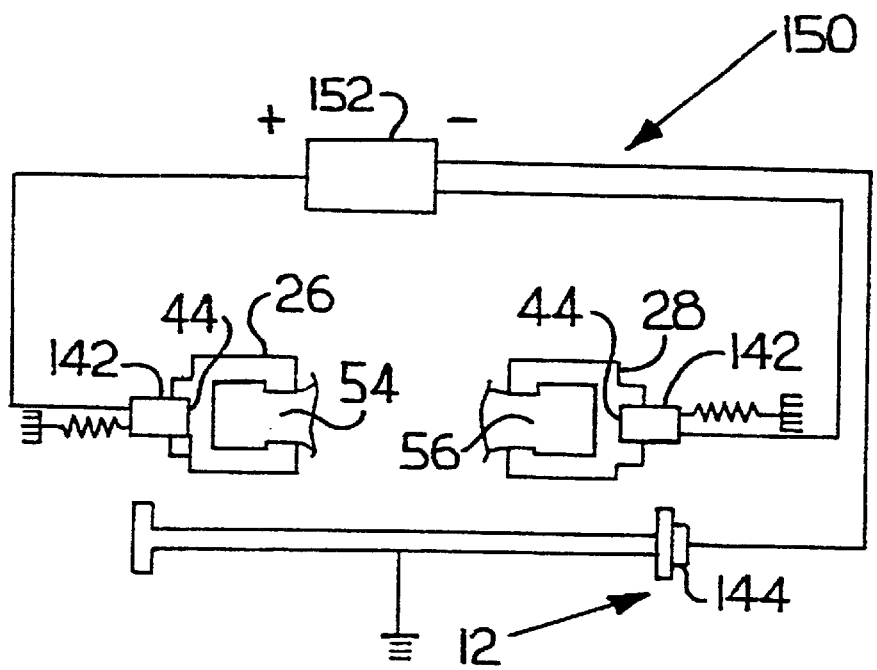
FIG. 17 is an electrical schematic of the vehicle transportation system of FIG. 15.
Figure 16:
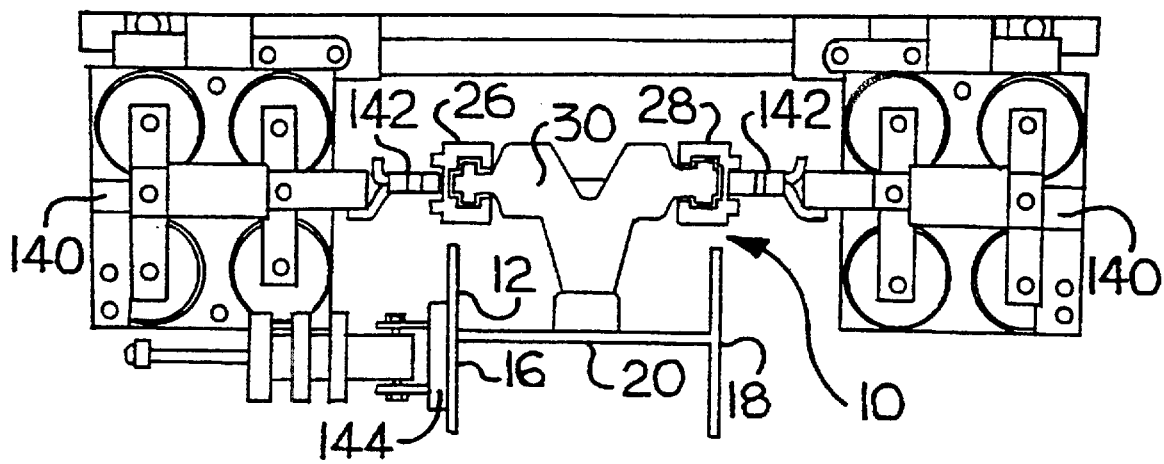
FIG. 16 is a front elevational view of a portion of the vehicle transportation system of FIG. 15 showing the power rail and guidebeam assembly and collector assemblies of a vehicle used in the system.
Figure 18:
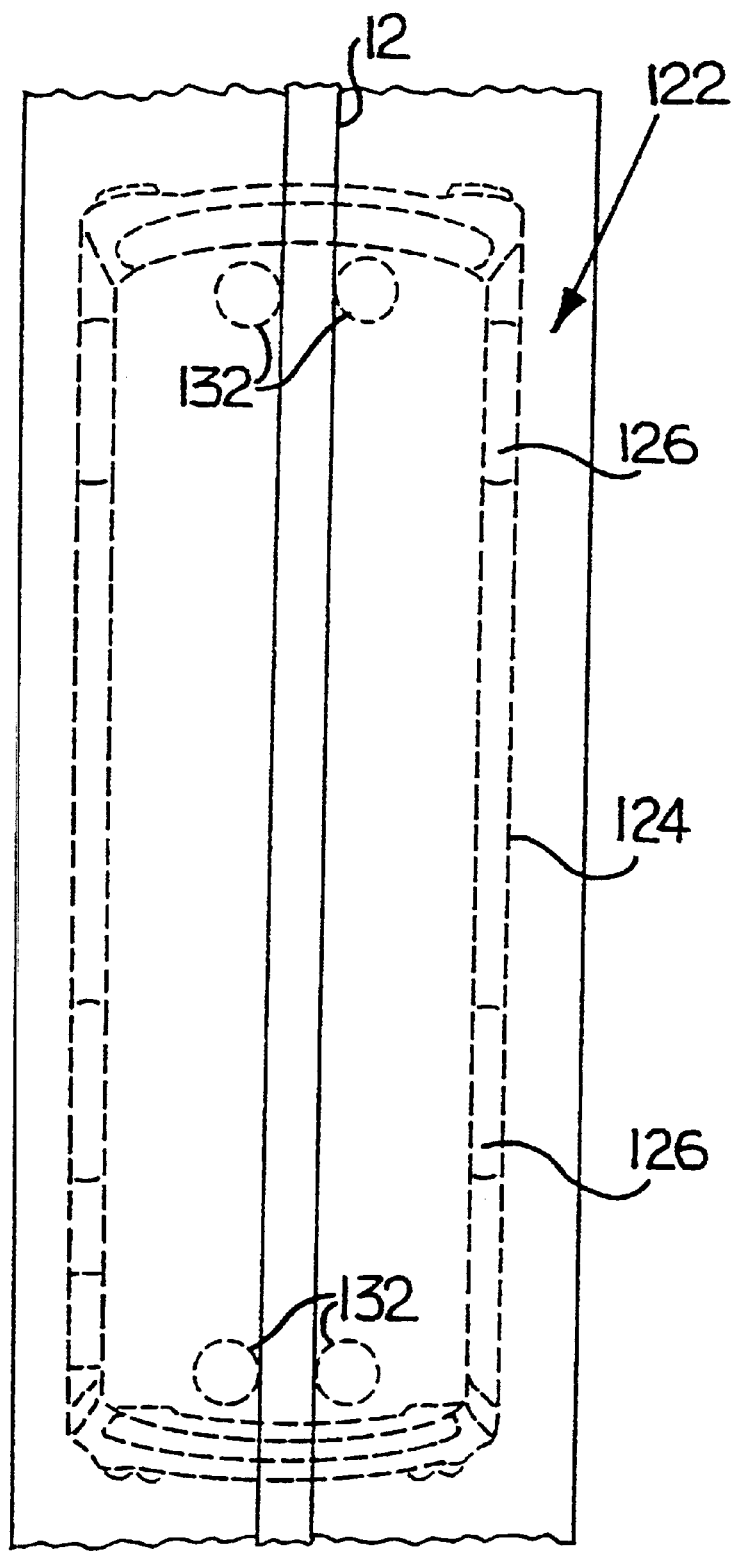
FIG. 18 is a top plan view of a portion of a guideway of the vehicle transportation system of FIG. 15 showing a vehicle in phantom on the guideway.

FIG. 16 shows enlarged details of the power collector assemblies 140, including the power contacts 142 and the ground contact 144 which engages flange 16 of the guidebeam 12. FIG. 17 is an electrical schematic of an electrical circuit 150 completed by the power contacts 142, the ground contact 144 and a drive and power system 152 located on the vehicle 124. The circuit 150 provides DC power to vehicle 124. In the circuit 150, flange 16 of the guidebeam 12 is grounded to earth and power rails 26, 28 are connected to the drive and power system 152. FIG. 18 shows a portion of the guideway 122 with the vehicle 124 and its drive wheels 126 shown in phantom. The guideway 122 is preferably made of concrete. The guidebeam 12, as shown, is adapted to guide or steer the vehicle 124 and is secured to the guideway 122.

FIG. 19 is a schematic top plan view showing the power rails 26, 28 defining an entry ramp end 160 having an angled orientation which assists in the initial positioning of the vehicle 124 on the guidebeam 12 and, more particularly, facilitates the smooth transition of the spring-loaded power contacts 142 into engagement with the power rails 26, 28. The entry ramp end 160 is located at an entry point of the vehicle 124 onto the assembly 10. The angled orientation of the power rails 26, 28 at the entry ramp end 160 allows the power contacts 142 to smoothly transition into engagement with the collector shoe contact surfaces 44 of the power rails 26, 28 without damaging the copper graphite material of the power contacts 142. A similar device (one arm only, not shown) will be incorporated to guide the ground contact 144 onto and off of the guidebeam 12. The angled orientation of the entry ramp end 160 may be provided at any point of the vehicle transportation system 120 where it is necessary for the power contacts 142 to smoothly transition into engagement with a collector shoe contact surface of a power rail.

FIG. 20 is a schematic top plan view showing adjacent power rails 26, 26' and 28, 28' at a switch gap 162 where, for example, the vehicle 124 would be able to change its direction of travel. The adjacent power rails 26, 26' and 28, 28' each include contact ramps 164 having a ramped or angled configuration. The contact ramps 164 allow the power contacts 142 attached to the vehicle collector assemblies 140, to smoothly transition into engagement with the collector shoe contact surface 44 (not shown) of the next adjacent power rail without damaging the copper graphite material of the power contacts 142. The contact ramps 164 compensate for any misalignment of the power contacts 142 with respect to the collector shoe contact surface 44 of the respective adjacent power rails 26, 28 and 26', 28'.

The present invention as described hereinabove provides a power rail and guidebeam assembly that can be incorporated into a vehicle transportation system with reduced construction cost. In particular, construction cost is reduced because the guidebeam is generally positioned on the guideway surface eliminating the need to construct an expensive "guideway pit" below the elevation of the drive wheels of the electrically powered vehicle. In addition, because the power rail and guidebeam assembly of the present invention is no longer located in a guideway pit, the electrical supply equipment attached to the power rail and guidebeam assembly is less susceptible to interference caused by dirt and moisture that unavoidably collects within a prior art guideway pit.

The present invention was described with reference to preferred embodiments which are merely illustrative of the present invention and not restrictive thereof. Obvious modifications and alterations of the present invention may be made without departing from the spirit and scope of the present invention. The scope of the present invention is defined by the appended claims and equivalents thereto.

What is claimed is:

1. A power rail and guidebeam assembly, comprising:
a guidebeam having an H-shaped body, with the body defined by two flanges interconnected by a web;
an insulating mounting bracket fixedly secured to the web, with the mounting bracket having a base and at least one ear; and
a power rail connected to the at least one ear of the mounting bracket,
wherein the power rail is electrically insulated from the guidebeam by the mounting bracket.

2. The power rail and guidebeam assembly as claimed in claim 1, wherein the guidebeam is configured to be grounded to earth.

3. The power rail and guidebeam assembly as claimed in claim 1, wherein the mounting bracket has a Y-shaped body and two spaced apart ears, and wherein the ears of the mounting bracket each have a power rail connected thereto.

4. The power rail and guidebeam assembly as claimed in claim 1, wherein the assembly includes a plurality of mounting brackets, and wherein at least one of the mounting brackets is fixed to the power rail by a pin passing through the power rail and the at least one ear of the mounting bracket.

5. The power rail and guidebeam assembly as claimed in claim 1, wherein a body of the power rail is made of aluminum.

6. The power rail and guidebeam assembly as claimed in claim 1, wherein a body of the power rail is C-shaped and defines a recess configured to receive the at least one ear of the mounting bracket.

7. The power rail and guidebeam assembly as claimed in claim 1, wherein a body of the power rail defines a collector opening configured to receive a power contact from an electrically powered vehicle.

8. The power rail and guidebeam assembly as claimed in claim 7, further including a collector shoe contact surface positioned in the collector opening and attached to the body of the power rail, and wherein the collector shoe contact surface is configured to engage the power contact.

9. A power rail and guidebeam assembly as claimed in claim 1, wherein the power rail further includes an electrically insulating cover.

10. The power rail and guidebeam assembly as claimed in claim 9, wherein the electrically insulating cover comprises PVC.

11. The power rail and guidebeam assembly as claimed in claim 1, wherein the web defines a plurality of holes and the base of the mounting bracket defines at least one hole, and wherein a fastener passes through the at least one hole in the base of the mounting bracket and one of the holes defined in the web such that the mounting bracket is secured to the web of the guidebeam.

12. The power rail and guidebeam assembly as claimed in claim 1, wherein the assembly includes a plurality of power rails positioned in end-to-end relationship, with adjacent power rails connected by a rail joint.

13. The power rail and guidebeam assembly as claimed in claim 12, wherein a body of each of the power rails is C-shaped and defines a recess, and wherein the rail joint extends between the adjacent power rails and is positioned within the recess defined by the body of the respective adjacent power rails.

14. The power rail and guidebeam assembly as claimed in claim 12, wherein the rail joint includes a strip portion and a body portion connected to the strip portion, and wherein the body portion is expandable by expansion members positioned within the body portion.

15. The power rail and guidebeam assembly as claimed in claim 14, further including a power connector assembly connected to the body portion of the rail joint by a pair of elongated coupling members, and wherein the power connector assembly is configured to provide direct current power to the power rails.

16. The power rail and guidebeam assembly as claimed in claim 1, wherein the assembly includes a plurality of power rails positioned in end-to-end relationship, with at least two adjacent power rails connected by an expansion joint that permits longitudinal expansion between the two adjacent power rails.

17. The power rail and guidebeam assembly as claimed in claim 16, wherein the expansion joint includes means for providing electrical continuity between the two adjacent power rails.

18. A vehicle transportation system, comprising:
an electrically powered vehicle having a vehicle body and a plurality of driving wheels connected to the vehicle body;

a guide-frame attached to the vehicle body, with the guide-frame having a plurality of depending guide wheels and a power contact; and a power rail and guidebeam assembly coacting with the guide wheels, with the power rail and guidebeam assembly further comprising:

a guidebeam having an H-shaped body, with the body defined by two flanges interconnected by a web, wherein the guide wheels of the guide-frame contact the flanges of the guidebeam;

an insulating mounting bracket fixedly secured to the web;

a power rail connected to the mounting bracket, wherein the power rail is electrically insulated from the guidebeam by the mounting bracket, wherein the power rail is configured to cooperate with the power contact from the vehicle for supplying direct current to the vehicle, and wherein the guidebeam is grounded earth.

19. The vehicle transportation system as claimed in claim 18, wherein the web extends along a horizontal axis.

20. The vehicle transportation system as claimed in claim 18, wherein the vehicle is positioned along a vertical passing through the web, and wherein the web extends an axis transverse to the vertical axis.

21. The vehicle transportation system as claimed in claim 20, further comprising a guideway along which the vehicle travels, wherein the guidebeam is secured to the guideway, and wherein the driving wheels of the vehicle contact the surface of the guideway.

22. The vehicle transportation system as claimed in claim 18, wherein the mounting bracket includes an ear, and wherein a body of the power rail is C-shaped and defines a recess configured to receive the ear of the mounting bracket.

23. The vehicle transportation system as claimed in claim 22, wherein the body of the power rail defines a collector opening configured to receive the power contact from the vehicle.

24. The vehicle transportation system as claimed in claim 23, further including a collector shoe contact surface positioned in the collector opening and attached to the body of the power rail, and wherein the collector shoe contact surface is configured to engage the power contact from the vehicle.

25. A power rail and guidebeam assembly, comprising:

a guidebeam having an H-shaped body, with the body defined by two flanges interconnected by a web;

a plurality of insulating mounting brackets fixedly secured to the web, with the mounting brackets each having a base and at least one ear; and a power rail secured to the at least one ear of each of the mounting brackets, wherein the power rail is electrically insulated from the guidebeam by the mounting brackets, wherein a body of the power rail is C-shaped and defines a recess configured to receive the at least one ear of the respective mounting brackets, and wherein the guidebeam is configured to be grounded to earth.

\* \* \* \* \*

UNITED STATES PATENT AND TRADEMARK OFFICE
CERTIFICATE OF CORRECTION

PATENT NO.    : 6,520,303 B1
DATED         : February 18, 2003
INVENTOR(S)   : Larry K. Malek et al.

It is certified that error appears in the above-identified patent and that said Letters Patent is hereby corrected as shown below:

Title page,
Item [56], References Cited, U.S. PATENT DOCUMENTS, Rodeseike patent, "3,208,245" should read -- 3,280,245 -- and "9/1965" should read -- 10/1966 --.

Column 11,
Line 23, "vertical passing" should read -- vertical axis passing --.

Signed and Sealed this

Twenty-sixth Day of August, 2003

JAMES E. ROGAN
*Director of the United States Patent and Trademark Office*